July 9, 1940. E. F. KURTZ 2,207,462

THERMOSTATIC CONTROL DEVICE

Filed Dec. 11, 1937 2 Sheets-Sheet 1

Edward F. Kurtz,
Inventor,
Deloe F. Haynes,
Attorney.

July 9, 1940.  E. F. KURTZ  2,207,462
THERMOSTATIC CONTROL DEVICE
Filed Dec. 11, 1937  2 Sheets-Sheet 2
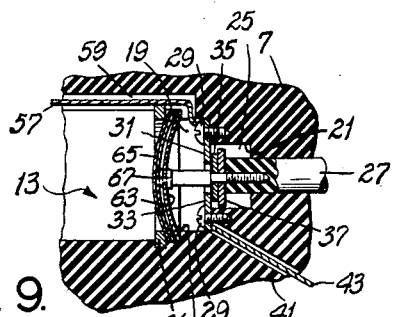
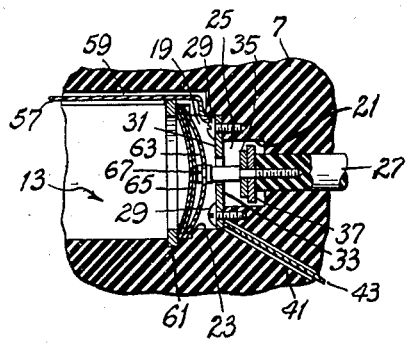
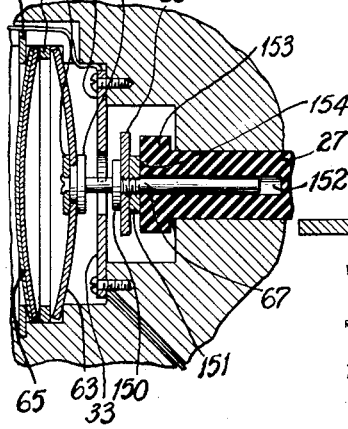
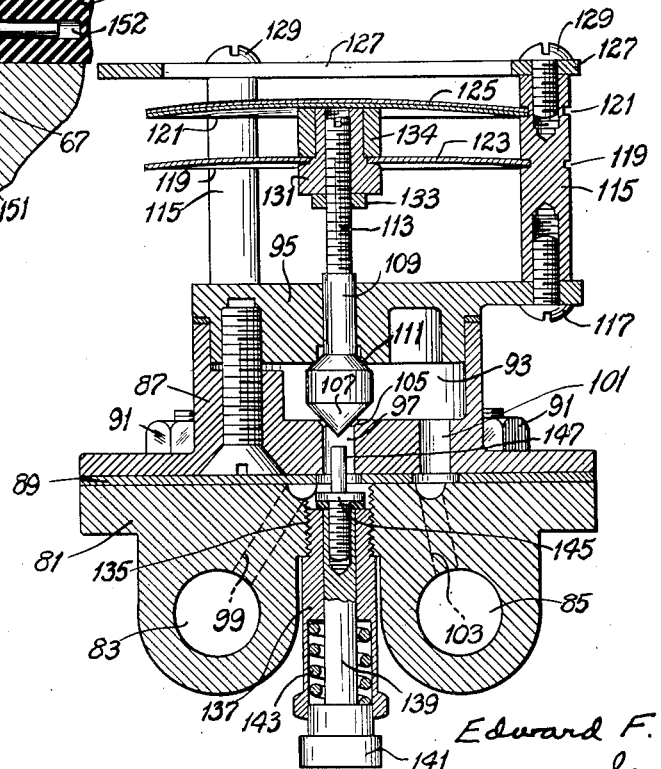

Patented July 9, 1940

2,207,462

UNITED STATES PATENT OFFICE 2,207,462

THERMOSTATIC CONTROL DEVICE

Edward F. Kurtz, Attleboro, Mass., assignor to Metals & Controls Corporation, Attleboro, Mass., a corporation of Massachusetts Application December 11, 1937, Serial No. 179,347

3 Claims. (Cl. 297—15)

This invention relates to thermostatic control devices, and with regard to certain more specific features, to thermostatic electric switches, thermostatic valves, and the like.

Among the several objects of the invention may be noted the provision of a thermostatic control device in which an automatic control action is provided upon the achievement of a predetermined temperature in one direction, but which device is required to be manually reset before it will occasion any further automatic action; the provision of a thermostatic device of the class described which, upon being subjected to an excessive temperature, performs a control action, such as the breaking of an electric circuit, but which device requires to be manually actuated before it will perform the reverse control action, such as the resumption of electrical connections; the provision of an electric cigar lighter embodying a thermostatic control of the type mentioned, which cigar lighter is thereby adapted automatically to cut itself out of an electrical heating circuit when its heating element has been brought to a proper temperature, but which cigar lighter requires manually to be actuated in a particular manner before it will again operate; the provision of a thermostatic control device in the form of a thermostatic valve, which valve is adapted automatically to close upon attainment of a certain temperature, but which valve will not thereafter reopen without manual actuation thereof; and the provision of a thermostatic control device of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a front elevation of a thermostatic control device, in the form of a cigar lighter, embodying the present invention;

Fig. 2 is an axial section of the cigar lighter of Fig. 1;

Figures 3, 4 and 5 are cross sections taken substantially along lines 3—3, 4—4 and 5—5, respectively, of Fig. 2;

Figures 6 and 7 are fragmentary axial sections showing certain of the elements of the Fig. 2 device in alternative positions;

Fig. 8 is an axial cross section of a valve embodying a thermostatic control device in accordance with the present invention; and Fig. 9 is an enlarged cross section of a fragment of an alternative structure.

Similar reference characters indicate corresponding parts throughout the several views of the drawings.

Figure 1:
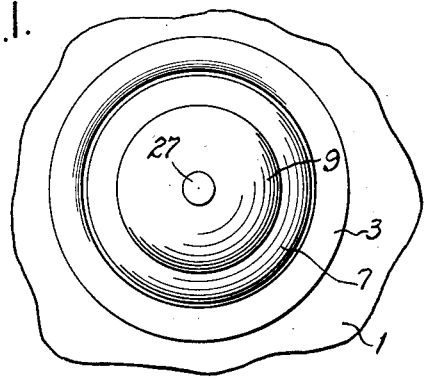
Figure 3:
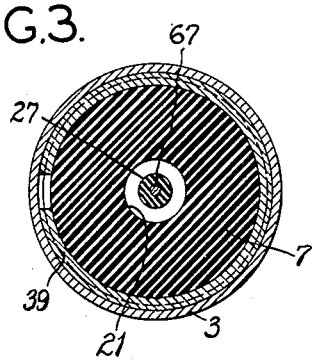

While the thermostatic control device of the present invention is of general utility in connection with electric switches, valves and like mechanisms, it can best be described in relation to its application to a particular article that is to be controlled. For this purpose, an electric cigar lighter has been chosen for the principal illustrative embodiment of the present invention. However, it will readily be understood that the invention applies to any and all forms of controlled devices, and that the cigar lighter is merely illustrative of such devices.

In Figures 1 to 7, inclusive, the invention is shown in its application to a cigar lighter of the type frequently found in automobiles, for example. Numeral I (Figures 1 and 2), for example, indicates the dashboard of the automobile, and numeral 3 indicates a cylindrical cup or socket that is mounted in said dashboard 1. The cup or socket 3 is preferably closed at its inner end, as indicated at numeral 5, although this is not a necessary provision. Fitting snugly within the cylindrical socket 3 is the body 7 of the cigar lighter proper, which is usually molded or otherwise formed from a thermoplastic material, such as Bakelite, that has a relatively high resistance to heat. The body 7 is cylindrical in shape, so that it slips lightly into the socket 3. At its projecting end, the body 7 is advantageously provided with a handle 9 that may take the form of a knob. At its inner end the body 7 is reduced in diameter, as indicated at numeral 11, for purposes hereinafter to be explained. The inner end of the body 7 is also hollowed out to provide a cylindrical chamber indicated generally by numeral 13, for enclosing operating mechanism presently to be described. At its outermost end, the walls of the chamber 13 are suitably threaded to receive the oppositely threaded rim portion 15 of a coiled heater element 17, which is a customary provision in cigar lighters of this general type. The heater element 17 is ordinarily in the form of a spirally coiled ribbon of high resistance metal, such as Nichrome.

The chamber 13 inwardly terminates as two regions 19 and 21 of progressively decreasing diameter. A shoulder 23 joins the portion 19 to the chamber 13 proper, while a shoulder 25 joins the portion 19 to the portion 21. The purposes of these shoulders will be made more apparent hereinafter.

The body 7 is drilled from end to end (connecting with the chamber portion 21), to receive a plunger rod 27 with a slip fit. The plunger rod 27 extends from in front of the knob 9 rearwardly into the chamber region 21.

Mounted on the shoulder 25 by means of screws 29 (see Fig. 4) are a pair of semi-circular, or more properly speaking semi-annular, contact plates 31 and 33. The inner edges of these plates considerably overlap the shoulder 25, so that they project over and partially cover the chamber region 21. The plates 31 and 33 are electrically insulated from each other except when they are connected together by means to be described.

Mounted on the inner end of plunger rod 27 is a contact plate 35, which is preferably spaced by a washer 37 from the end of the plunger rod 27. The contact plate 35 is of such size that it is adapted to bridge across between the contact plates 31 and 33, to connect them together, when the plunger rod 27 is suitably advanced into the body 7.

Numeral 39 indicates a contact ring that is preferably molded into the outer surface of body 7, in such manner as to project slightly therefrom. The ring 39 fits tightly against the casing or socket member 3, and makes electrical connections therewith as one of the external connections to the cigar lighter. Numeral 41 indicates a hole that is drilled through the body 7 in order to accommodate a wire 43 that connects the ring 39 electrically to the lower contact plate 33.

Also molded into the reduced end portion 11 of the body 7 in such manner as to project slightly therefrom is a second connecting ring indicated by numeral 45. In order to make external electrical connections to the ring 45, a spring brush or contacting element 47 is mounted in the walls of socket 3, suitable insulating washers 49 and a terminal piece 51 being provided for exterior connections. A hole 53 in the body 7 provides room for a wire 55 which connects the ring 45 to one end of the heating coil 17. The other end of the heating coil 17 is electrically connected by a wire 57, which lies in an axial slot 59 provided in the wall of chamber 13, to the contact plate 31.

Resting against the shoulder 23, and secured there by a snap ring 61 fitted in a suitable groove in the walls of chamber 13, are preferably a pair of snap-acting discs 63 and 65. Both the discs 63 and 65 are of a dished nature, and are capable of being snapped into oppositely dished positions. The disc 63 is preferably made of a spring metal, such as steel or spring brass, but the disc 65 is made of composite thermostatic metal, or bi-metal, and thus is in accordance with the disclosure of Spencer Patent 1,448,240. While the rims or outer peripheries of the discs 63 and 65 are confined between the snap ring 61 and the shoulder 23, this confinement is not binding, but is of a relatively loose sort permitting both discs freely to snap between their positions of opposite concavity. It is understood, of course, that instead of disc 63, any overcenter spring may be used; and instead of disc 65, other types of thermal elements may be used.

The central portion of disc 63 is connected by a machine screw 67 to the inner end of plunger rod 27. Suitable flanges on the end of screw 67 provide that the plunger rod 27 will always follow said disc 63 in its movement.

A characteristic of the spring disc 63 is that it will remain in either position of concavity in which it is placed. That is to say, it is perfectly stable in either of its two opposite positions of concavity. In the case of the thermostatic disc 65, however, for a given temperature condition, the disc has but one stable position of concavity. For a relatively "cold" temperature, that is, any temperature below a predetermined temperature, the thermostatic disc 65 is concave in the direction shown in Fig. 2, that is, presenting its concave face towards the front of the body 7. At any temperature above the predetermined temperature, however, the thermostatic disc 65 automatically reverses its curvature to the position shown in Fig. 7, that is to say, it is concave toward the rear of the plug 7.

The operation of the cigar lighter as thus described is as follows:

External electrical connections are made to the device through the terminal piece 51, and through the socket 3, the latter of which is ordinarily a ground connection. As heretofore explained, the exterior connection to terminal piece 51 is transmitted, through brush 47, to the ring 45, and then in turn through wire 55 to the heating element 17. The other end of the heating element 17 is in a normally open-circuit connection with ring 39, through wire 57, contact plate 31, contact plate 33, and wire 43.

Figure 2:
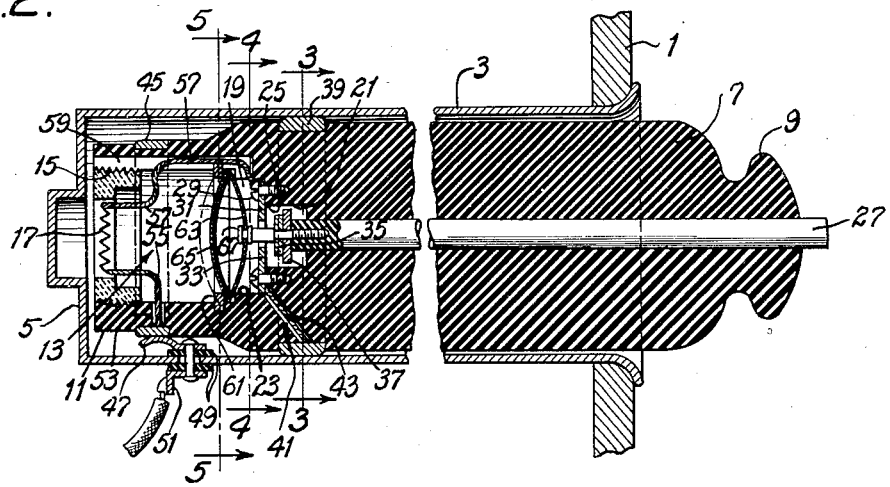
Figure 4:
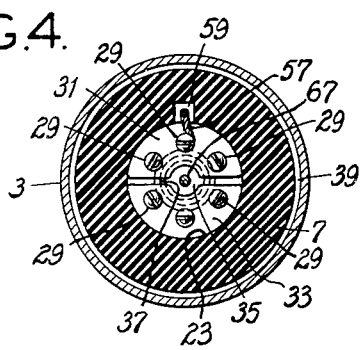
Figure 5:
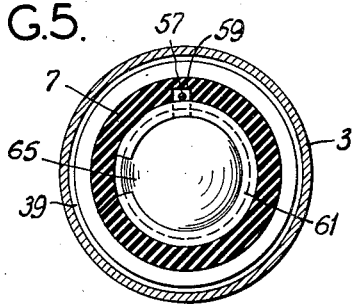

In its ordinary, non-operating condition as mounted on the dashboard 1, the various elements, including particularly the discs 63 and 65 and the plunger rod 27, are all in the position shown in Fig. 2. To electrically actuate the heating element 17 from this position, the operator first pushes the plunger 27 inwardly into the body 7, preferably without disturbing the condition of the body 7 in the socket 3. The inward motion of the plunger 27 is transmitted by the screw 67 to the spring disc 63, and this disc is thus overcentered to its position of reverse curvature, as shown in Fig. 6. The contact plate 35 is thus brought into bridging position and held in engagement under tension from disc 63, across the plates 31 and 33, and the electrical circuit is thus completed to the heater 17. The heater 17 thereupon commences to heat.

Radiant heat from the heater 17 then commences to heat the thermostatic disc 65. By selecting the disc 65 so that it has the proper temperature response characteristics, the heater 17 will have come to a suitably heated condition (for cigar or cigarette lighting purposes) just as the snapping temperature of the disc 65 is reached. When said snapping temperature is reached, the disc 65 will suddenly automatically overcenter to its position of reverse curvature, and in so doing, it will forcibly overcenter the spring disc 63 back to its original position, all as indicated in Fig. 7. This motion of the spring disc 63 will in turn be transmitted by the screw 67 to the plunger 27, the end of which will thus be forced out from the handle 9 of the plug 7. By making the plunger rod 27 and handle 9 of contrasting colors, the reappearance of the end of the plunger rod will serve as a signal to the user of the lighter that it is properly heated and in condition for use. By the same motion, the contact bridging plate 35 is withdrawn from its connecting position across the plates 31 and 33 and the electrical circuit to the heater 17 is thereby broken.

Thereupon the operator may grasp the handle 9 and remove the body 7 from the socket 3 and use it for cigar or cigarette lighting purposes in the customary manner. Or, if in the meanwhile the user has decided not to use the device, or has forgotten that he initially actuated it, the element 17 will cool without danger of its becoming overheated or of its continually using up current from the battery.

As the heating element 17 cools, it permits the thermostatic disc 65 also to cool, and when the temperature becomes low enough, said thermostatic element 65 automatically snaps back to its initial position, as indicated in Fig. 2, but without thereby causing a resetting of the spring disc 63. Before said spring disc may be again overcentered, a manual pushing of the plunger rod 27 is needed, in the manner heretofore described.

It is thus seen that in the present invention a cigar lighter is provided which is semi-automatic in its operation, in the proper manner for the safety factors involved. That is to say, the lighter can be manually actuated in order to commence its heating, and when it achieves its proper temperature, it will automatically electrically disconnect itself from the heating current and will remain disconnected until it is again manually actuated to connecting position. This arrangement makes for maximum safety in the operation of the lighter, and in addition provides against wastage of the current.

As has heretofore been intimated, the principles of the present invention are applicable to many devices other than cigar lighters. For example, the basic principles of the invention may be applied to any electrical switching mechanism wherein it is desired that one set of circuit conditions can be achieved only by a manual actuation but wherein automatic change of the manually achieved circuit condition to another circuit condition is a desideratum. To this end, it may be said that the functional parts of the device comprise the spring disc 63 and the thermostatic disc 65, the means by which they are mounted in abutting relation, and the manually operated actuating means for the spring disc 63.

The principles of the present invention also find application in devices other than thermostatic electric switches. Fig. 8, for example, shows how the invention may be embodied in a valve device. Referring now more particularly with Fig. 8, numeral 81 indicates a valve body that is provided with an inlet 83 and an outlet 85. A complementary body portion 87 is secured to the body 81, with an interposed gasket 89, by means of bolts 91. The body portion 87 is provided with an interior valve chamber 93, and is closed by a suitably gasketed cover 95. A first passage 97 leads from the chamber 93 to the face of the body portion 87, where it meets with a suitable opening in the gasket 89. The body portion 81 is provided with a companion passage 99, connected to the inlet 83. A second passage 101 in the body portion 87 similarly leads to and connects with, through a suitable opening in the gasket 89, a companion passage 103 in the body portion 81, which connects to the valve outlet 85.

The inner end of the opening 97 constitutes a valve seat indicated by numeral 105, against which reciprocably seats a valve closure element or head 107 that has a cylindrical portion 109 sliding in a suitable opening in the cover 95. This opening is preferably provided with a back-seating valve seat 111, also cooperating with the valve head 107, so that leakage through said opening is avoided. The valve stem 109 is continued as a threaded portion 113. Numerals 115 indicate a plurality of posts or mounting columns that extend upwardly from the cover 95, and are held in position by screws 117. Each of the posts 115 is provided with a pair of annular grooves or slots 119 and 121. The grooves 119 all serve to support the periphery of a spring snap-acting disc 123, which is analogous to the spring disc 63 of the first embodiment, while the grooves 121 all serve to support a composite thermostatic metal snap-acting disc 125 analogous to the thermostatic snap-acting disc 65 of the first embodiment. At their outer ends, the posts 115 are strengthened and secured in position by means of a ring 127 and screws 129.

Numeral 131 indicates a hub element that is threaded on to the end 113 of the valve stem 109. A lock nut 133 is also preferably provided to secure the hub 131 in position. The hub 131 passes through a suitable opening in the center of disc 123, and a washer or collar 134 is fitted tightly in position on the hub 131 in order that the central portion of disc 123 may thus be tied in to move with the valve stem 109 in both directions. The outer ends of the hub element 131 and collar 134 constitute an abutment against the surface of the central portion of thermostatic disc 125, which, in the embodiment shown, is not drilled or otherwise open.

Threaded into a suitable opening 135 in the said body portion 81 is a cylindrical element 137, which is arranged to be coaxial with the valve stem 109. The cylindrical element 137 receives a reciprocable pin 139, which has a head or handle 141 available for manipulation at the front of the device. A compression spring 143 maintains the head 141 normally in extended position, as indicated in Fig. 8. The plunger 139 is prevented from leaving the cylindrical element 137 by means of a flanged pin 145 that is axially threaded into the inner end of said plunger 139. The pin 145 has an extension 147 that passes across the opening in gasket 89, and into the passage 97 in body portion 87, for manipulative purposes to be described.

Other mechanical features of the valve will be apparent on inspection of Fig. 8, without further description thereof.

The operation of this embodiment of the invention is basically quite similar to that of the embodiment previously described. In the position shown in Fig. 8, for example, it will be seen that the closure element 107 is lifted from the valve seat 105, and hence fluid can flow from the inlet 83 through the passages 99 and 97 to the chamber 93 and then out through the passages 101 and 103 to the outlet 85.

The device is so mounted that the thermostatic disc 125 is subjected to an ambient temperature which it is desired to control. In the position shown in Fig. 8, the thermostatic disc 125 is in its relatively cold position for normal operation, although if it is desired to cut off the flow of fluid through the valve upon the attainment of a given cold temperature, rather than a given hot temperature, the device may be arranged in such manner that Fig. 8 represents the hot position of the thermostatic disc 125. However, in normal operation, Fig. 8 is considered as representing the cold position of the disc 125. When the predetermined snapping temperature of the disc 125 is reached, it will reverse its curvature from the Fig. 8 position, and in so doing (through its abutment on the hub 131 and collar 134), it will reverse the curvature of spring disc 123 and thus cause the valve stem 109 to slide inwardly into the cover 95. The valve closure element 107 is thus brought to seat firmly on the valve seat 105, and communication between the inlet 83 and the outlet 85 is thereby cut off.

If the external temperature to which the disc 125 is subjected now drops below a suitable predetermined temperature, the disc 125 will snap back to its Fig. 8 position, but in so doing it will not carry with it the disc 123, nor will it thereby open the valve. Opening of the valve can be accomplished only by the manual operation of pressing the handle 141 against the spring 143, to bring the pin 147 to bear on the end of valve closure element 107 and thus manually overcenter the spring disc 123. Upon such manual operation, the device becomes set or cocked, as it were, for further automatic operation under control of the thermostatic disc 125.

It will therefore be seen that, basically, the operation of the valve embodiment of Fig. 8 is similar in most respects to the operation of the electric switch embodiment of Fig. 2.

The control device of the present invention may similarly be designed into and incorporated in many other types of devices wherein a temperature control action is desired, as heretofore described.

Fig. 9 illustrates an embodiment of the invention that has the plunger rod 27 trip-free of the switch, but is otherwise like the Fig. 2 embodiment. Referring to Fig. 9, it will be seen that contact plate 35 is fastened to rod 67 by means of an abutment 150 and a nut 151. The nut 151 threads on a suitably threaded portion of rod 67. Disc 63 is fastened to the end of rod 67 by means of an abutment 148 and a nut 149, the nut 149 being screwed down tightly against a suitable shoulder at the end of the rod 67 so as to allow disc 63 to move relatively freely on this end.

The other end of rod 67 fits into hole 152 drilled or molded in the inner end of plunger rod 27. This same inner end of rod 27 is provided with a projecting end or abutment 153 which prevents plunger rod 27 from being pulled out of the lighter. The innermost end, 154, of plunger rod 27, pushes against the contact plate assembly 35 and forces rod 67 toward the left in the direction of the contact plates 31 and 33. The spacing between the rod 67 and the plunger rod 27 is so arranged that when the outer end of rod 27 is flush with the end of the lighter, disc 63 has been carried just past its overcenter position, but the contact plate 35 has not made contact with the plates 31 and 33. The overcenter action of disc 63 then carries plate 35 into firm bridging position across plates 31 and 33. A spacer ring 155 is provided between the discs 63 and 65 to allow disc 65 to start its travel before it touches disc 63; and thus any inherent creep movement of disc 65 is taken care of before disc 63 moves and the contacts break. Spacer 155 should be thicker than nut 149 by the amount of free travel that is desired before disc 65 hits disc 63.

When disc 65 heats up, it snaps to the right in the manner hitherto described and forces disc 63 back past its over center position and consequently breaks contact across plates 31 and 33. If now plunger 27 is held in its innermost position, that is, with its outer end flush with the end of the cigar lighter, there is still room for disc 65 to snap disc 63 back far enough to break contact. In case such should occur, the resulting action of the cigar lighter would be for disc 65 to snap over, push disc 63 over and thus break contact, cool down, allow disc 63 to pull contact plate 35 into bridging position again, and then this cycle would be repeated. In other words, by making the actuating mechanism trip-free of the plunger 27, the danger of having the heater of the lighter overheat and burn out, is eliminated.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermostatic control comprising a composite thermostatic metal plate having two oppositely-facing positions of concavity between which it automatically snaps in response to temperature changes, means mounting said thermostatic plate at one portion thereof leaving another portion thereof free to undergo said snap movement, a resilient plate of a shape substantially the same as that of the thermostatic plate, having two oppositely facing positions of concavity between which it snaps when suitably actuated by imposed forces, said resilient plate being mounted in said mounting means in such manner that said thermostatic plate is capable, when automatically snapping in one direction, of bearing on the movable portion of said resilient plate to snap it in the same direction, said thermostatic plate, however, being incapable of snapping the resilient plate in the other direction, and means mounted in said mounting means and secured to said resilient plate manually actuatable to snap said resilient plate in the direction in which said thermostatic plate is incapable of snapping it.

2. A thermostatic control comprising a composite thermostatic metal plate having two oppositely-facing positions of concavity between which it automatically snaps in response to temperature changes, means mounting said thermostatic plate at one portion thereof leaving another portion thereof free to undergo said snap movement, a resilient plate of a shape substantially the same as that of the thermostatic plate, having two oppositely-facing positions of concavity between which it snaps when suitably actuated by imposed forces, said resilient plate being mounted in said mounting means in such manner that said thermostatic plate is capable, when automatically snapping in one direction, of bearing on the movable portion of said resilient plate to snap it in the same direction, said thermostatic plate, however, being incapable of snapping the resilient plate in the other direction, and means mounted in said mounting means and secured to said resilient plate manually actuatable to snap said resilient plate in the direction in which said thermostatic plate is incapable of snapping it, said resilient and thermostatic plates being concentrically mounted in a parallel manner.

3. A thermostatic control comprising a composite thermostatic metal plate having two oppositely-facing positions of concavity between which it automatically snaps in response to temperature changes, means mounting said thermostatic plate at one portion thereof leaving another portion thereof free to undergo said snap movement, a resilient plate of a shape substantially the same as that of the thermostatic plate, having two oppositely-facing positions of concavity between which it snaps when suitably actuated by imposed forces, said resilient plate being mounted in said mounting means in such manner that said thermostatic plate is capable, when automatically snapping in one direction, of bearing on the movable portion of said resilient plate to snap it in the same direction, said thermostatic plate, however, being incapable of snapping the resilient plate in the other direction, a control element actuated by said resilient plate, and means mounted in said mounting means and secured to said resilient plate manually actuatable to snap said resilient plate in the direction in which said thermostatic plate is incapable of snapping it.

EDWARD F. KURTZ.